United States Patent
Jacobs

(10) Patent No.: US 8,417,817 B1
(45) Date of Patent: Apr. 9, 2013

(54) PREVENTING SERVER OVERLOAD

(75) Inventor: Aaron Jacobs, Ashfield (AU)

(73) Assignee: Google Inc., Mountain View, CA (US)

( * ) Notice: Subject to any disclaimer, the term of this patent is extended or adjusted under 35 U.S.C. 154(b) by 262 days.

(21) Appl. No.: 12/882,903

(22) Filed: Sep. 15, 2010

(51) Int. Cl.
 *G06F 15/173* (2006.01)
 *G06F 13/42* (2006.01)
 *G08B 25/00* (2006.01)
 *G01R 31/08* (2006.01)

(52) U.S. Cl. ........ 709/226; 709/223; 709/224; 709/225; 340/1.1; 340/1.2; 340/16.1; 370/229

(58) Field of Classification Search ............ 709/223, 709/224, 225, 226; 340/1.1, 1.2, 1.3, 1.4, 340/1.5, 1.6; 370/229; 710/150
See application file for complete search history.

(56) References Cited

U.S. PATENT DOCUMENTS

| | | | |
|---|---|---|---|
| 7,752,629 B2 * | 7/2010 | Revanuru et al. | 718/105 |
| 7,774,492 B2 * | 8/2010 | Raphel et al. | 709/235 |
| 7,986,625 B2 * | 7/2011 | Chase et al. | 370/231 |
| 2002/0198993 A1 * | 12/2002 | Cudd et al. | 709/225 |
| 2004/0218617 A1 * | 11/2004 | Sagfors | 370/412 |
| 2010/0238801 A1 * | 9/2010 | Smith et al. | 370/229 |

* cited by examiner

*Primary Examiner* — Hassan Kizou
*Assistant Examiner* — Deepa Belur
(74) *Attorney, Agent, or Firm* — Fish & Richardson P.C.

(57) ABSTRACT

Methods, systems, and apparatus, including computer programs encoded on a computer storage medium, for preventing server overload. In one aspect, a method includes placing each request of a plurality of requests into a queue. Requests are popped from the queue, and for each popped request, in response to popping the request: a counter value is incremented; computing resources are allocated for the request; a determination is made that a condition for which computing resources allocated for the request can be de-allocated has occurred; and the counter value is decremented after the condition occurs. In response to determining that the counter value does not exceed a threshold number, requests continue to be popped from the queue. In response to determining that the counter value exceeds the threshold number, requests are not popped from the queue until the counter value is decremented to or below the threshold number.

11 Claims, 4 Drawing Sheets

PREVENTING SERVER OVERLOAD

BACKGROUND

This specification relates to computer server systems.

A server receives requests from various users and allocates computing resources, e.g., memory and processing time, to handle the requests in a timely manner. For example, a web server providing a search service receives search requests from users. For each search query the web server receives, the web server must identify relevant search results and return those results to the user who submitted the query. For some queries, the web server allocates a large amount of memory to identify relevant search results. For example, where the search results for a query include images, the web server allocates memory for each image, e.g., a server that creates map images may need to allocate an image buffer of several megabytes, and the buffer may last for several hundred milliseconds. These resource allocations may cause the server to run out of physical memory or exceed a memory quota imposed on the process by another system, and the server process may be terminated. If the server process is terminated for this reason, the server may not reply gracefully with an error message to the users who have requests in flight when it was terminated, but instead may never reply. This degrades the user experience.

SUMMARY

A server receives requests from client devices and puts the requests into a queue. The server does not allocate more than a minimum amount of memory for a request while it is in the queue. The server pops requests off the queue, allocates computing resources for the requests, and handles the requests while tracking the total number of requests that the server is handling. If the total number of requests exceeds a threshold number of requests, the server ceases popping requests off the queue until the server has handled enough requests to reduce the total number of requests being handled below the threshold.

When the server pops a request off the queue, the server determines whether the age of the request exceeds a threshold age. If the request is too old, the server does not allocate resources for the request and discards the request. The server sends an error message to the user who sent the request.

In general, one innovative aspect of the subject matter described in this specification can be embodied in methods that include the actions of placing each request of a plurality of requests into a queue; popping requests from the queue, and for each popped request, in response to popping the request: incrementing a counter value indicating a number of requests being handled; allocating computing resources for the request; determining that a condition for which computing resources allocated for the request can be de-allocated has occurred; and decrementing the counter value after the condition occurs; determining whether the counter value exceeds a threshold number of requests being handled; in response to determining that the counter value does not exceed a threshold number of requests being handled, continuing to pop requests from the queue; and in response to determining that the counter value exceeds the threshold number of requests being handled, ceasing to pop requests from the queue until the counter value is decremented to or below the threshold number. Other embodiments of this aspect include corresponding systems, apparatus, and computer programs, configured to perform the actions of the methods, encoded on computer storage devices.

These and other embodiments can each optionally include one or more of the following features. Popping requests from the queue further includes, for each popped request: determining a difference between a time stamp of the request and a current time; and if the difference exceeds a threshold difference, discarding the request without allocating computing resources for the request or determining a response for the request. Discarding the request includes sending an error message to a device that sent the request. Placing each request of the plurality of requests into the queue comprises receiving the requests from a plurality of client devices in an order and placing the requests into the queue in the order they are received. The response includes one or more images. Allocating computing resources for a request includes allocating an amount of memory for the request, and the threshold number of requests being handled is based on a maximum amount of memory per request and an amount of available memory. Placing one or more additional requests into the queue is independent of ceasing to pop requests from the queue. Each request is a search query and each response includes a plurality of search results. Determining that a condition for which computing resources allocated for the request can be de-allocated has occurred comprises determining a response for the request. Decrementing the counter value after the condition occurs further comprises de-allocating the computing resources allocated for the request.

Particular embodiments of the subject matter described in this specification can be implemented so as to realize one or more of the following advantages. A server can be prevented from allocating more computing resources than it has available, and thus abrupt server terminations are avoided. When the server receives more requests than it can allocate computing resources to handle, the server can hold the requests to respond to later or send error messages to requesting client devices, which informs the users of the client devices of the errors. To prevent the queue from growing extremely large, the server can move through a queue of requests by discarding requests older than a certain age, thus responding to more recent requests. This also avoids an overall decrease in server response time to outstanding requests. Additionally, this remedial operation is inexpensive, and allows the server to quickly catch up to the region of the queue that has not yet become too old.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
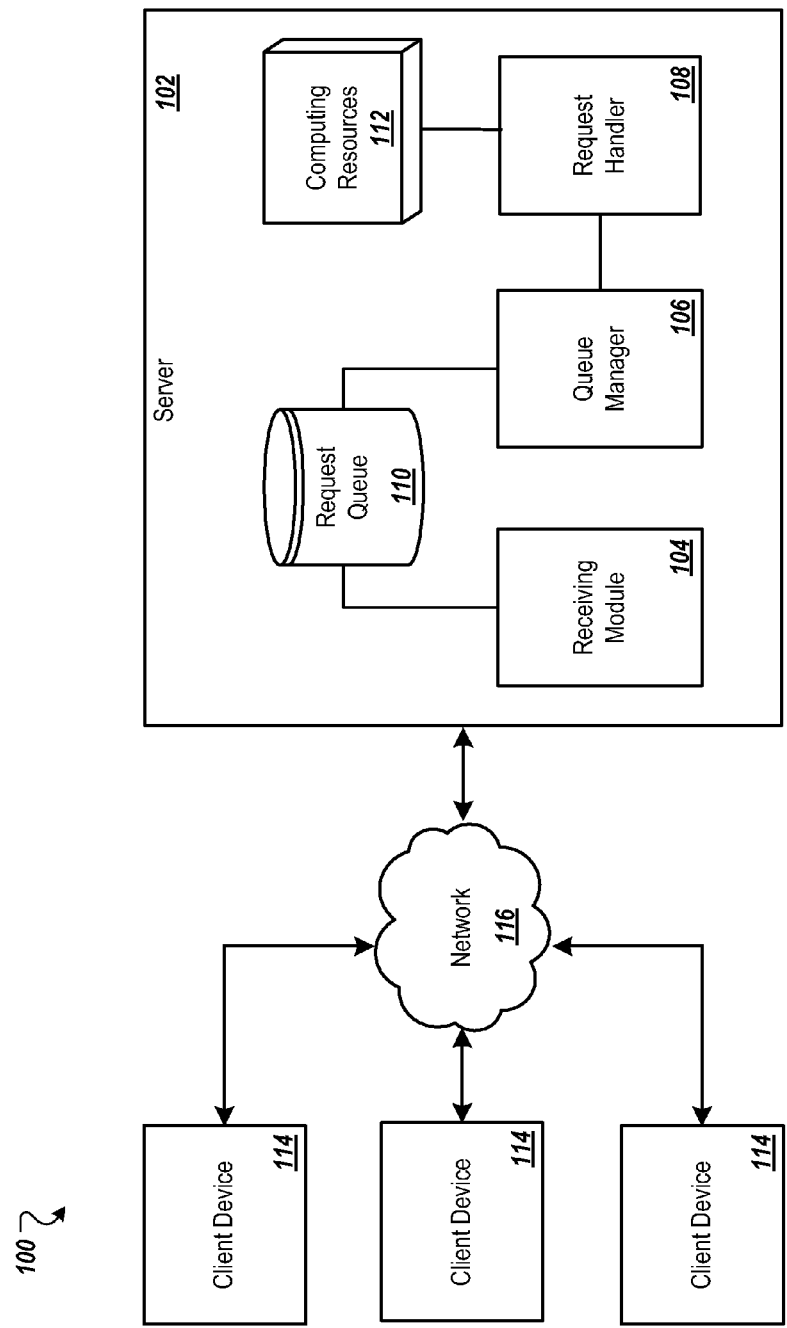
FIG. 1 is a block diagram of an example environment in which a server queues incoming requests and handles the requests after popping them off the queue.

FIG. 1 is a block diagram of an example environment 100 in which a server 102 queues incoming requests and handles the requests after popping them off the queue. The server 102 includes one or more data processing apparatus. A network 116, e.g. a local area network (LAN), a wide area network (WAN), or the Internet connects client devices 114 and the server 102.

The server 102 receives requests from the client devices 114 and returns responses to the requests to the client devices 114. For example, the server 102 may be a search engine, and the server 102 receives search queries and provides search results responsive to the search queries. In another example, the server 102 may provide email services or social networking services, and the server 102 receives requests for email messages or social network status updates and provides the email messages and status updates. A client device 114 typically includes a user application, such as a web browser or other application, to facilitate the sending and receiving of data over the network 116.

The server 102 includes various modules 104, 106, and 108, e.g., executable software programs, that are executed by the server 102. As shown, the server 102 includes a receiving module 104 for receiving requests, a queue manager 106 for managing a request queue 110, and a request handler 108 for allocating computing resources 112 and handling requests. Each module runs, for example, as part of the operating system on the server 102, as an application on the server 102, or as part of the operating system and part of an application on the server 102. Although several modules 104, 106, and 108 are illustrated, there may be fewer or more modules. Moreover, although only one server 102 is shown, the sever 102 may include more than one computer device, i.e., the server may include multiple computer devices that are logically represented as a single server, and the modules can be distributed on one or more data processing apparatus connected by one or more networks or other suitable communication mediums.

The receiving module 104 receives requests from client devices 114. The receiving module 104 places each received request into the request queue 110, which is a first in, first out data structure. For example, in the case where a request is a Hypertext Transfer Protocol (HTTP) request, the receiving module 104 may place the text of the HTTP request in the queue 110. In another example, the receiving module 104 may create a function pointer to an executable function that initiates request handling for the request and place the function pointer in the queue 110. The request handler 108 can then execute the function when the function pointer is popped off the queue by the queue manager 106. In some implementations, the receiving module 104 appends a time stamp to each request place on the queue 110, e.g., a time when the request was received or placed into the queue.

In some implementations, the receiving module 104 runs independently of, and in parallel with, the queue manager 106 and the request handler 108. Thus, the receiving module 104 continues to add requests to the queue 110 even when the queue manager 106 ceases to pop requests from the queue 110.

The queue manager 106 pops requests from the queue 110. The queue manager 106 maintains a counter value indicating a number of requests being handled. When the queue manager 106 pops a request from the queue 110, the queue manager 106 increments the counter value. After the request handler 108 determines a response for the request, the queue manager 106 decrements the counter value.

When the queue manager 106 determines that the counter value exceeds a threshold number of requests being handled, the queue manager 106 ceases to pop requests from the queue until the counter value is decremented to or below the threshold number. While the queue manager 106 ceases to pop requests from the queue 110, the queue manager 106 continues to decrement the counter value as the request handler 108 handles requests that the queue manager previously popped off the queue 110.

The threshold number of requests is, in some implementations, based on a total amount of computing resources 112 for the server. The computing resources 112 include, for example, memory and scheduled processing time on one or more processors. In some implementations, the threshold number of requests is based on the total amount of memory available to the server 102 divided by the size of the largest set of objects that may be allocated for any request.

In some implementations, the total number of requests that can be processed at any one time is set to a configurable value, N, and the memory usage of the sever 102 is approximately bounded by N*M, where M is the size of the largest set of objects that may be allocated for any user request. Both of the values of N and M can be set by system administrators, and are based on the resources available to the server and the estimated largest set of objects that may be allocated for any user request. The later parameter can be determined, for example, from empirical data or by an administrator. Thus, by only allocating resources to a request after it is popped from the queue, the resources allocated to the server can be controlled to ensure that they do not exceed the maximum resource allocation requirements.

In some implementations, the queue manager 106 determines, for each request it pops off the queue 110, a difference between a time stamp of the request and the current time. If the difference exceeds a threshold difference, the queue manager 106 discards the request. The request handler 108 does not allocate computing resources for discarded requests or determine responses for discarded requests. In this manner, when the server 102 receives a spike in the rate of incoming requests, and/or if the queue begins to grow too large, the server 102 can quickly process the requests in the queue 110 to catch up to requests that are recent. In some implementations, when the queue manager 106 discards a request, the queue manager 106 sends an error message to the requesting client device 114.

The request handler 108 determines responses for requests popped off the queue 110 by the queue manager 106. For example, if the server 102 is a search engine and the request is a search query, the request handler 108 identifies search results responsive to the search query. The request handler 108 allocates computing resources 112 for each request. For example, the request handler 108 may allocate an amount of memory for each request, schedule processing time on one or more processors, or both. Some requests require a significant allocation of computing resources, for example, where a response to a search query includes images or other audiovisual content and that is stored in memory on the server 102.

The computing resources 112 in FIG. 1 are shown as being connected to the request handler 108 because the request handler 108 allocates computing resources for responses to requests. The computing resources 112 can also be used by the receiving module 104 and the queue manager 106 and other components of the server 102. For example, one or more processors included in the computing resources 112 may be used to execute the receiving module 104 or the queue manager 106 or both in parallel. In another example, the request queue 110 may be stored in memory included in the computing resources 112.

Figure 2:
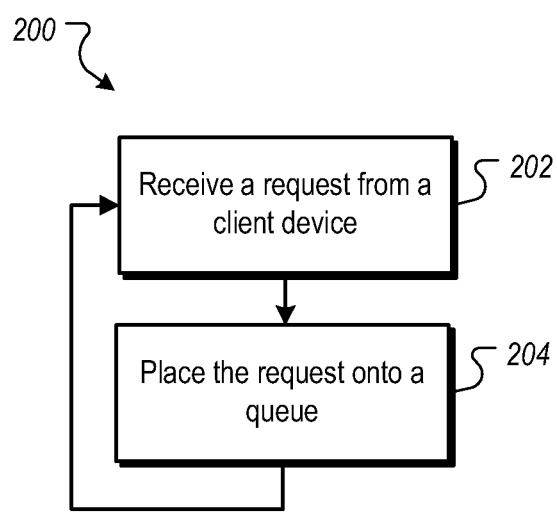
FIG. 2 is a flow diagram of an example process for receiving requests.

FIG. 2 is a flow diagram of an example process 200 for receiving requests. In some implementations, the process 200 is performed by a server, e.g., the server 102 of FIG. 1 executing the receiving module 104. For purposes of illustration, the process 200 will be described with respect to a server that performs the process 200.

The server receives a request from a client device, e.g., one of the client devices 114 of FIG. 1 (202). The server places the request into a queue, e.g., the request queue 110 of FIG. 1 (204). The server repeats the process 200 for each request that it receives. The server can execute the process 200 independently of, and in parallel with, other processes executing on the server.

Figure 3:
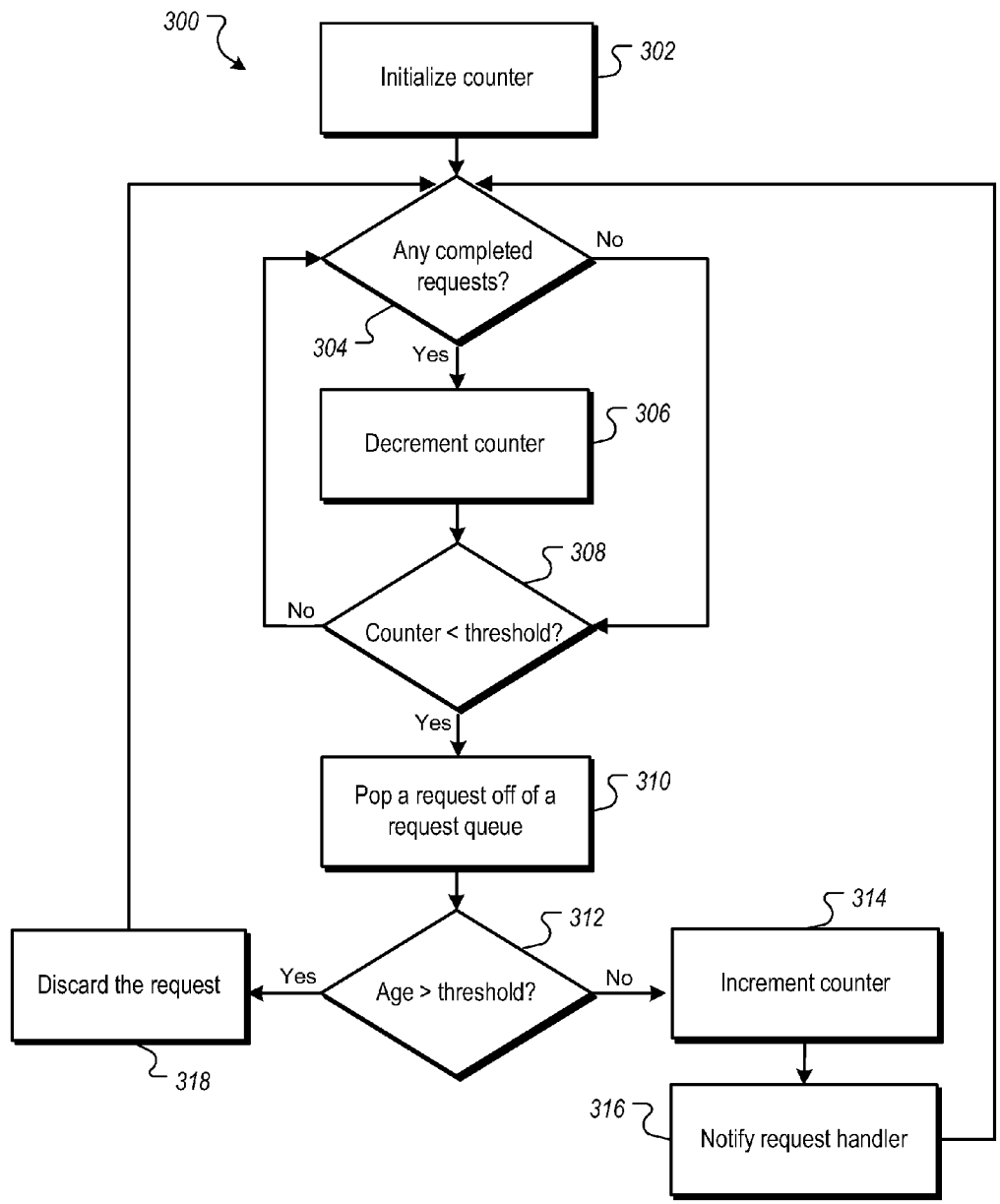
FIG. 3 is a flow diagram of an example process for managing a request queue.

FIG. 3 is a flow diagram of an example process 300 for managing a request queue. In some implementations, the process 300 is performed by a server, e.g., the server 102 of FIG. 1 executing the queue manager 106. For purposes of illustration, the process 300 will be described with respect to a server that performs the process 300. The server can execute the process 300 independently of, and in parallel with, other processes executing on the server.

The server initializes a counter value (302). The counter value indicates a number of requests being handled by the server. As described herein, a request is considered as being handled by the server after the server has allocated computing resources for a response to the request. Typically, the server initializes the counter value by setting it to zero.

The server determines whether any requests have been completed (304). The server completes requests, for example, while executing a request handler (e.g., the request handler 108 of FIG. 1) in parallel with the process 300. A request is completed, for example, when results to the request are sent to a client device from which a request was received, or upon any other occurrence of a system condition that allows for the de-allocation of the resources allocated for the request. For each completed request, the server decrements the counter value (306).

The server determines whether the counter value is below a threshold value (308). If the server determines that the counter value is not below the threshold value, the server returns to step 304 to determine whether any requests have been completed so that the counter value can be decremented below the threshold value. By repeating steps 304-308, the server can wait for requests to complete before popping additional requests off a request queue.

If the server determines that the counter value is below the threshold, the server pops a request off a request queue, e.g., the request queue 110 of FIG. 1 (310). The server determines whether the age of the request exceeds a threshold age (312), for example, by determining a difference between a time stamp of the request and a current time.

If the server determines that the age of the request exceeds the threshold age, the server discards the request (318) without allocating computing resources for the request or determining a response for the request. The server then returns to step 304. By discarding a number of requests without allocating resources and determining responses for the requests, the server can quickly begin handling requests that are more recent after receiving a sudden increase in incoming requests.

If the server determines that the age of the request does not exceed the threshold age, the server increments the counter value (314) and notifies a request handler that the request is ready to be handled (316). The server then returns to step 304 so that the server can pop additional requests from the queue as long as the counter value remains below the threshold.

In some implementations, the age threshold check can be omitted. In other implementations, the age threshold check can be done only if the queue size exceed a threshold queue size S, which may occur when the server 102 receives a spike in requests. Spikes in request can occur, for example, where a major news event occurs, or at certain times of the day.

Figure 4:
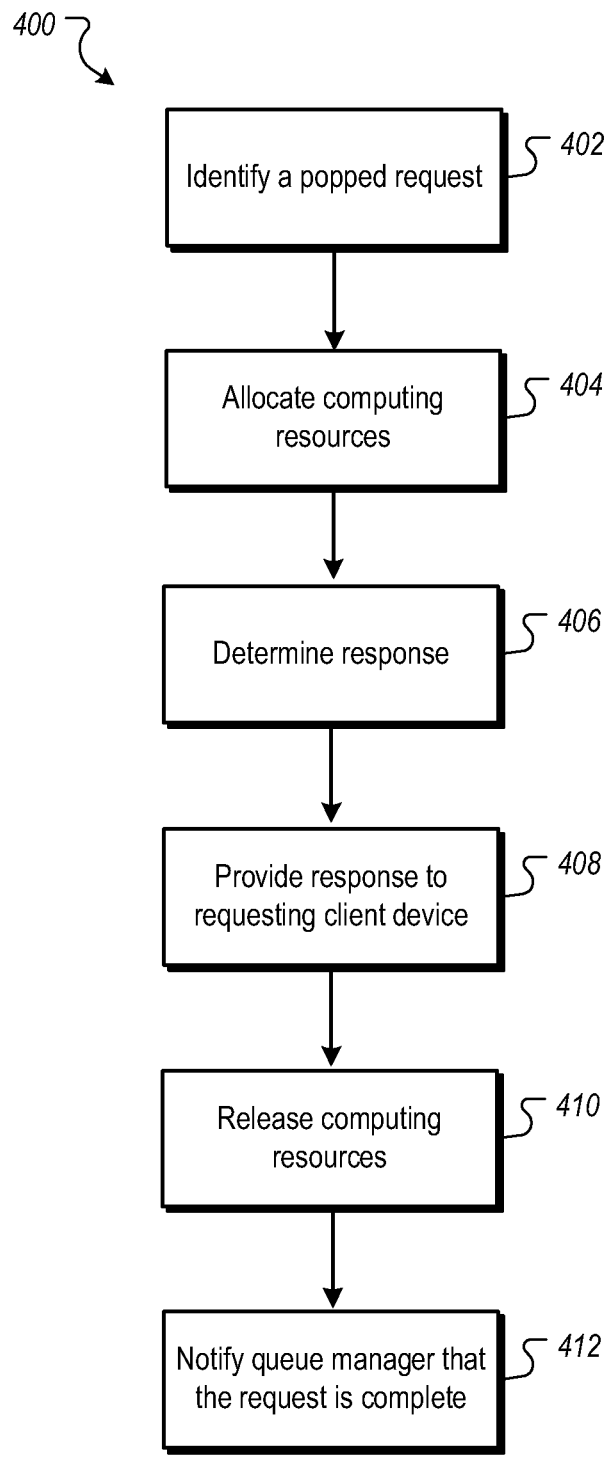
FIG. 4 is a flow diagram of an example process for handling requests.

FIG. 4 is a flow diagram of an example process 400 for handling requests. In some implementations, the process 400 is performed by a server, e.g., the server 102 of FIG. 1 executing the request handler 108. For purposes of illustration, the process 400 will be described with respect to a server that performs the process. The server can execute the process 400 independently of, and in parallel with, other processes executing on the server.

The server identifies a popped request (402). For example, the server may pop the request from a queue while executing the process 300 illustrated in FIG. 3 in parallel with the process 400. The server allocates computing resources for a response to the request (404). The server determines a response to the request (406). The server provides the response to the requesting client device (408). For example, the server may make the response available for download by the requesting client device. After providing the response to the requesting client device, the server releases the computing resources allocated to the request. The server notifies a queue manager process that the request is complete (412).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    placing each request of a plurality of requests into a queue, each request for an image;
    popping requests from the queue, and for each popped request, in response to popping the request:
        incrementing a counter value indicating a number of requests being handled;
        allocating memory for an image satisfying the request and storing the image in the allocated memory;
        determining that the image specified by the request has been transmitted to a requester of the request and de-allocating the memory for the image in response to the determination; and
        decrementing the counter value after de-allocating the memory;
    determining whether the counter value exceeds a first threshold number of requests being handled;
    in response to determining that the counter value does not exceed the first threshold number of requests being handled, continuing to pop requests from the queue, wherein the first threshold number of requests being handled is based on a maximum amount of memory per request and an amount of available memory; and
    in response to determining that the counter value exceeds the first threshold number of requests being handled, ceasing to pop requests from the queue until the counter value is decremented to or below the first threshold number, including:
        determining that the counter value exceeds a second threshold number of requests being handled;
        in response to determining that the counter value exceeds the second threshold number of requests being handled, discarding a first plurality of requests from the queue, including, for each of the first plurality of requests in the queue:
            determining a difference between a time stamp of the request and a current time; and
            if the difference exceeds a threshold difference, discarding the request without allocating computing resources for the request or determining a response for the request, wherein discarding the request includes sending an error message to a device that sent the request.

2. The method of claim 1, wherein placing each request of the plurality of requests into the queue comprises receiving the requests from a plurality of client devices in an order and placing the requests into the queue in the order they are received.

3. The method of claim 1, wherein placing one or more additional requests into the queue is independent of ceasing to pop requests from the queue.

4. The method of claim 1, wherein each request is a search query and each response includes a plurality of search results.

5. The method of claim 1, wherein storing the image in the allocated memory comprises creating a map image.

6. A system comprising:
    a data processing apparatus; and
    a memory couple to the data processing apparatus having instructions stored thereon which, when executed by the data processing apparatus cause the data processing apparatus to perform operations comprising:
        placing each request of a plurality of requests into a queue, each request for an image;
        popping requests from the queue, and for each popped request, in response to popping the request:
            incrementing a counter value indicating a number of requests being handled;
            allocating memory for an image satisfying the request and storing the image in the allocated memory;
            determining that the image specified by the request has been transmitted to a requester of the request and de-allocating the memory for the image in response to the determination; and
            decrementing the counter value after de-allocating the memory;
        determining whether the counter value exceeds a first threshold number of requests being handled;
        in response to determining that the counter value does not exceed the first threshold number of requests being handled, continuing to pop requests from the queue, wherein the first threshold number of requests being handled is based on a maximum amount of memory per request and an amount of available memory; and
        in response to determining that the counter value exceeds the first threshold number of requests being handled, ceasing to pop requests from the queue until the counter value is decremented to or below the first threshold number, including:
            determining that the counter value exceeds a second threshold number of requests being handled;
            in response to determining that the counter value exceeds the second threshold number of requests being handled, discarding a first plurality of requests from the queue, including, for each of the first plurality of requests in the queue:
                determining a difference between a time stamp of the request and a current time; and
                if the difference exceeds a threshold difference, discarding the request without allocating computing resources for the request or determining a response for the request, wherein discarding the request includes sending an error message to a device that sent the request.

7. The system of claim 6, wherein placing each request of the plurality of requests into the queue comprises receiving the requests from a plurality of client devices in an order and placing the requests into the queue in the order they are received.

8. The system of claim 6, wherein placing one or more additional requests into the queue is independent of ceasing to pop requests from the queue.

9. The system of claim 6, wherein each request is a search query and each response includes a plurality of search results.

10. The system of claim 6, wherein storing the image in the allocated memory comprises creating a map image.

11. A computer program product encoded on a computer readable storage device, operable to cause a data processing apparatus to perform operations comprising:
    placing each request of a plurality of requests into a queue, each request for an image;
    popping requests from the queue, and for each popped request, in response to popping the request:
        incrementing a counter value indicating a number of requests being handled;
        allocating memory for an image satisfying the request and storing the image in the allocated memory;
        determining that the image specified by the request has been transmitted to a requester of the request and de-allocating the memory for the image in response to the determination; and decrementing the counter value after de-allocating the memory;

determining whether the counter value exceeds a first threshold number of requests being handled;

in response to determining that the counter value does not exceed the first threshold number of requests being handled, continuing to pop requests from the queue, wherein the first threshold number of requests being handled is based on a maximum amount of memory per request and an amount of available memory; and in response to determining that the counter value exceeds the first threshold number of requests being handled, ceasing to pop requests from the queue until the counter value is decremented to or below the first threshold number, including:

determining that the counter value exceeds a second threshold number of requests being handled;

in response to determining that the counter value exceeds the second threshold number of requests being handled, discarding a first plurality of requests from the queue, including, for each of the first plurality of requests in the queue:

determining a difference between a time stamp of the request and a current time; and if the difference exceeds a threshold difference, discarding the request without allocating computing resources for the request or determining a response for the request, wherein discarding the request includes sending an error message to a device that sent the request.

* * * * *